United States Patent [19]

Jubb

[11] 3,710,115
[45] Jan. 9, 1973

[54] SUNBURN WARNING DEVICE COMPRISING DETECTING THE ULTRA-VIOLET COMPONENT OF SOLAR RADIATION

[76] Inventor: James R. Jubb, 10304 Bellefontaine Road, St. Louis, Mo. 63137

[22] Filed: Aug. 4, 1969

[21] Appl. No.: 847,348

[52] U.S. Cl. ..........................250/83.3 UV, 356/226
[51] Int. Cl. ................................................G01j 1/02
[58] Field of Search..........250/83.3 UV, 86; 356/226

[56] References Cited

UNITED STATES PATENTS 2,422,766  6/1947  Alexander..........................356/226 X
2,531,000  11/1950  Scott...............................250/83.3 UV

*Primary Examiner*—Archie R. Borchelt
*Attorney*—Roger M. Hibbits

[57] ABSTRACT

The present invention relates to a sunburn warning device comprising radiation detection means, integrator means, measurement means and indicating means to advise the user of the amount of radiation received related to the time of exposure.

2 Claims, 5 Drawing Figures

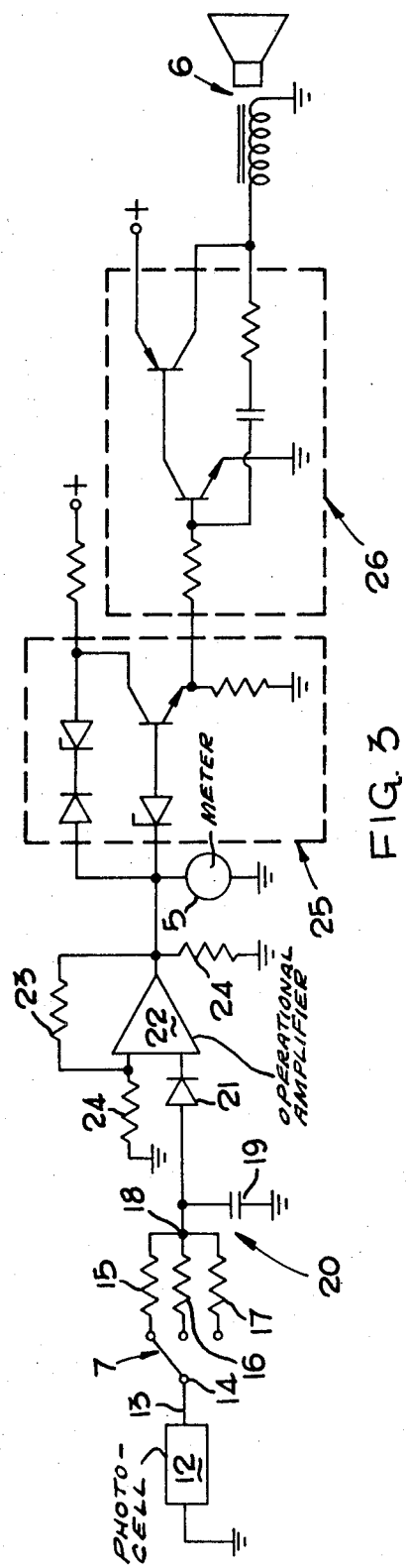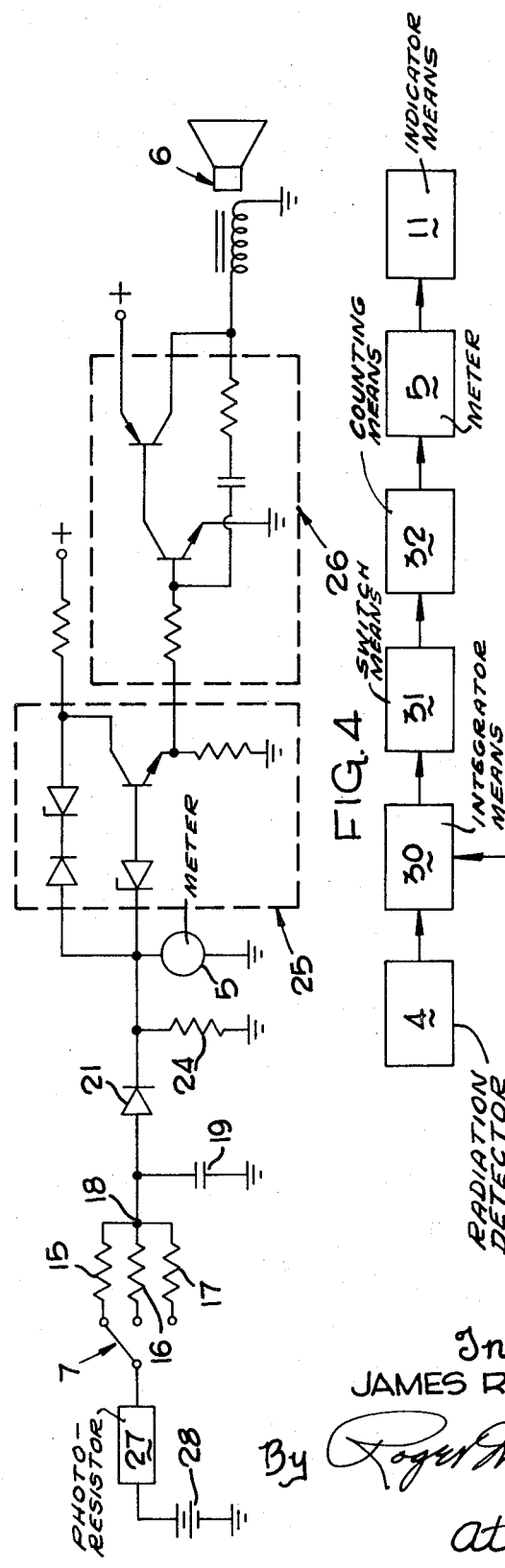

3,710,115

SUNBURN WARNING DEVICE COMPRISING DETECTING THE ULTRA-VIOLET COMPONENT OF SOLAR RADIATION

BACKGROUND OF THE INVENTION

Of common concern to sportsmen, vacationers, sunbathers and the like is excessive exposure to harmful solar radiation.

In the past and present considerable effort has been expended to develop compounds for use on the skin prior to exposure to minimize harmful effect and compounds for use on the skin as a healant after exposure has occurred. However, the former compounds offer non-uniform protection which is non-quantitative while the latter is useful only after the harm has occurred.

SUMMARY OF THE INVENTION

The present invention contemplates a device which may be used by persons exposed to the sun to provide them with a quantitative and qualitative indication of the amount of exposure they are subjecting themselves to and also when the exposure reaches a harmful level, to provide them with a warning indication in the form of a warning light, colored tape, audible tone or the like.

It is therefore an object of the present invention to provide a device which will provide a continuous indication of the amount of exposure.

Another object of the present invention is to provide such a device which will provide clear indications of the degree of exposure.

Another object of the present invention is to provide such a device which is adjustable to accommodate users with skins of different degrees of sensitivity and pigmentation.

A further object of the present invention is to provide such a device which will provide such indications on a cumulative or non-cumulative basis.

A further object of the present invention is to provide such a device that is highly transportable and is readily mountable on irregular or sloping terrain and thus readily adjusted to an appropriate attitude.

These together with other objects and advantages, which will become subsequently apparent, reside in the details and construction and operation as more fully hereinafter described and claimed, reference being had to the accompanying drawings forming a part hereof, wherein like numerals refer to like parts throughout and in which;

BRIEF DESCRIPTION OF THE DRAWINGS

FIG. 3 is an electric circuit diagram of a sunburn anticipator constructed in accordance with and embodying the present invention.

FIG. 4 is another electric circuit diagram of a sunburn anticipator constructed in accordance with and embodying the present invention.

FIG. 5 is a functional block diagram of sunburn anticipator constructed in accordance with and embodying the present invention.

DETAILED DESCRIPTION OF THE INVENTION

Figure 1:
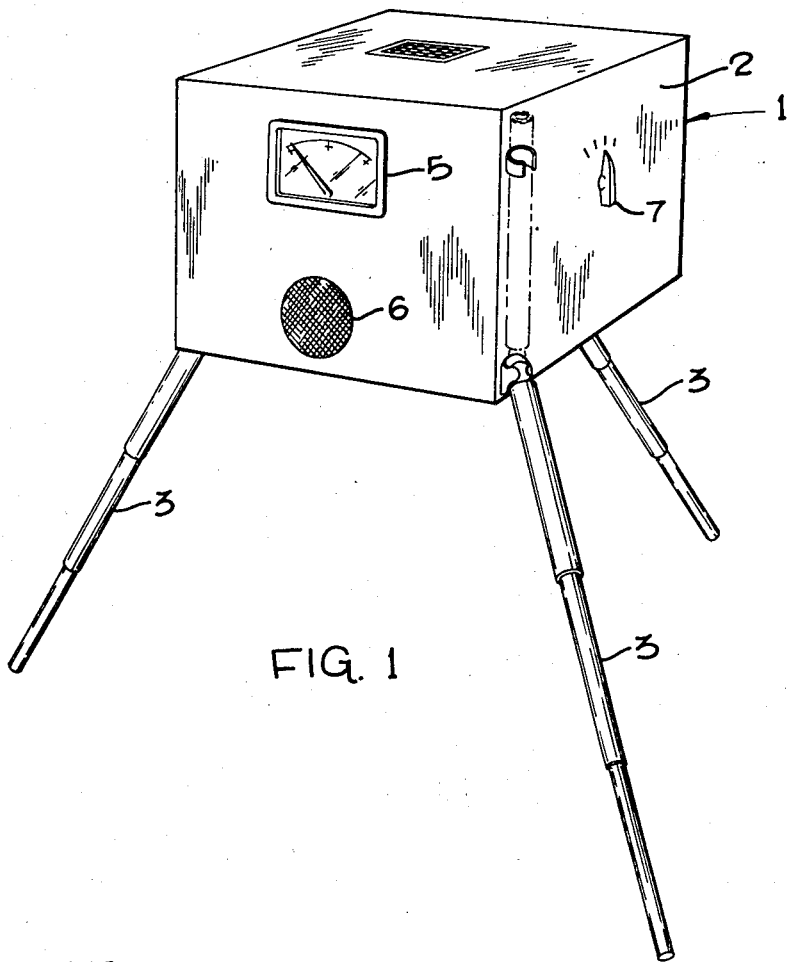
FIG. 1 is a perspective view of a sunburn anticipator constructed in accordance with and embodying the present invention.

Referring now in more detail and by reference characters to the drawings which illustrate practical embodiments of the present invention, FIG. 1, designates a perspective view of sunburn anticipator, 1, constructed in accordance with and embodying the present invention.

In FIG. 1 sunburn anticipator, 1, is seen to comprise case, 2, which is provided with three legs, 3, radiation detector, 4, mounted in the upper surface thereof, meter means, 5, speaker, 6, and sensitivity switch, 7.

Legs, 3, are constructed such that they consist of multiple sections constructed in a manner that the legs may be lengthened or shortened in a manner similar to a telescope and thereby allow setting up sunburn anticipator, 1, on irregular or sloping terrain. When sunburn anticipator, 1, is not in use, legs, 3, may be collapsed, pivoted in ball sockets, 8, and secured to the sides of case, 2, by means of clips, 9.

Figure 2:
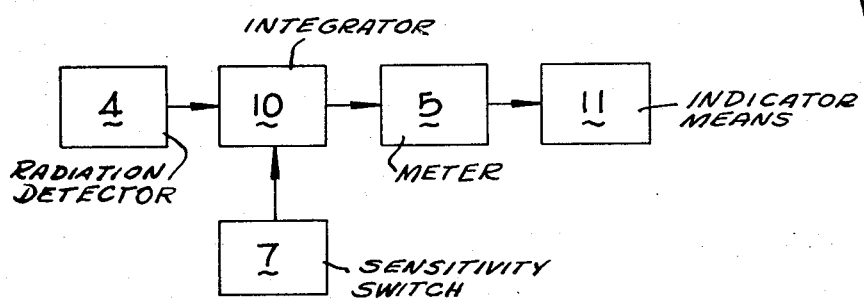
FIG. 2 is a functional block diagram of the sunburn anticipator shown in FIG. 1.

FIG. 2, illustrates functionally the main elements of sunburn anticipator, 1, which are radiation detector, 4, integrator, 10, meter, 5, and indicator means, 11. Indicator means, 11, as shown in FIG. 1, includes speaker, 6.

An embodiment of sunburn anticipator, 1, is shown in greater detail in the electric circuit diagram of FIG. 3.

In FIG. 3, radiation detector, 4, is seen to comprise photocell, 12, which may typically be International Rectifier No. S1M the output of which is nominally 0 volts d-c to 0.4 volts d-c for weather conditions varying between a zenith sun and full darkness. Radiation detector, 4, includes a filter to reject solar radiation of wavelength longer than 3,000 angstroms.

The signal output, 13, of photocell, 12, is connected to the pole, 14, of sensitivity switch, 7, which is shown as a single pole, triple-throw switch. Resistors, 15, 16, and, 17, are shown connected together at one end of each resistor at terminal, 18. The other ends of said resistors are connected to the non-pole terminals of switch, 7, such that for each position of switch, 7, one of said resistors is connected in series with the output of photocell, 12. Resistors, 15, 16, and, 17, are typically, 0.600 megohms, 1.2 megohms and 1.8 megohms respectively in the configuration shown in FIG. 3. Capacitor, 19, is connected from terminal, 18, to ground. Resistor, 15, 16, and, 17, in combination with capacitor, 19, thus provide an integrator, 20, of the output of photocell, 12, with time constant dependent upon the position of switch, 7.

The output of integrator, 20, is connected through diode, 21, to an input of operational amplifier, 22. Typically, diode, 21, is a commercially available diode such as a 1N914. Feedback resistor, 23, and resistor, 24, are connected as shown in FIG. 2 to give operational amplifier, 22, the desired characteristics. Output resistor, 24, is connected to an output terminal of amplifier, 12. The output voltage across resistor, 24, is nominally, 0 volts d-c to 9.0 volts d-c.

Meter means, 5, is seen to comprise meter, 5, and associated circuitry, connected to the output of operational amplifier, 22. Meter, 5, may typically be a conventional 100 microampere meter movement. Meter means, 5, is thus capable of continuous measurement of sunburn dosage and display thereof to a user.

Indicator means, 11, which continuously accepts measurement of sunburn dosage, provides an indication to the user when a predetermined dosage has been reached, and is seen to comprise threshhold detector, 25, tone generator, 26, and speaker, 6, which it typically an 8-ohm, 1-inch speaker. Threshhold detector, 25, and tone generator, 26, are of conventional design. Power to sunburn anticipator, 1, may be supplied by commercially available batteries compatible with the configuration of case, 2.

Threshhold detector, 25, assures zero input to tone generator, 26, until the output of operational amplifier, 22, reaches an appropriate level or value. When such predetermined value has been reached, threshhold detector, 25, provides an input signal to tone generator, 26, which in turn provides an audio range a-c signal to speaker, 6, which provides an audible tone to warn the user that a predetermined amount of sunburn dosage has been reached.

Operational amplifier, 22, shown in FIG. 3 may be replaced by a conventional transistor amplifier provided with a relatively high input impedance.

Another embodiment of the present invention is shown in FIG. 4 wherein radiation detector, 4, comprises photo resistor, 27, which is energized by battery, 28. In the embodiment shown in FIG. 4, the output of diode, 21, is connected directly to resistor, 24. In this embodiment the value of resistor, 24, is increased over that used in the configuration shown in FIG. 3.

Another embodiment of the present invention is shown in FIG. 5. In the embodiment shown in FIG. 5, sunburn anticipator, 29, comprises, radiation detector, 4, integrator means, 30, sensitivity switch, 7, switch means, 31, counting means, 32, meter means, 5, and indicator means, 11.

Radiation detector, 2, may be either type shown in FIGS. 3 or 4. Integrator means, 30, may be the same as integrator, 10, shown in FIG. 3. Meter, 5, and indicator means, 11, may be identical to those used in sunburn anticipator, 1, as shown in FIG. 3.

Switch means, 31, may be a conventional transistor electronic switch which provides an output pulse, the duration of which is a function of the amplitude of the output of integrator means, 30. Counting means, 32, may be a conventional binary counter using well known flip-flop circuitry. Switch means, 31, and counter means, 32, is readily provided using conventional electromechanical switches, solenoids, counters and tape recorder mechanisms. Meter, 5, may be replaced by color coded tape appropriately driven and indicator means, 11, may readily use a warning light or tape.

It should be understood that changes and modifications in the form, construction, arrangement, combination of the elements of the sunburn anticipator and methods of making and using the same may be made and substituted for those herein shown and described without departing from the nature and principle of my invention.

Having thus described my invention, what I claim and desire to secure by United States Letters Patent is:

1. A sunburn anticipator for detecting solar radiation of wavelength less than 3,000 angstroms comprising,
   base means,
   electric circuit components operably mounted on said base means, said electric circuit components comprising,
   radiation detection means,
   integrator means, said integrator means connected such that it will integrate any output of said radiation detection means,
   switch means, said switch means connected to provide a pulse output the duration of which is a function of the output from said integrator,
   counter means, said counter means connected to measure the duration of any pulses from said switch means,
   metering means, said metering means connected to alternately measure the output of said integrator means and the output of said counter means, and
   indicator means, said indicator means connected so as to give an indication to the user the solar radiation level or that it has reached a predetermined cumulative value.

2. A sunburn anticipator for detecting solar radiation of wavelength less than 3,000 angstroms comprising
   base means,
   electric circuit components operably mounted on said base means, said electric circuit components comprising,
   radiation detector means,
   integrator means, said integrator means connected such that it will integrate any output of said radiation detector means,
   switching means operably connected to said integrator means adapted to adjust the time constant thereof,
   switch means, said switch means connected to provide a pulse output, the duration of which is a function of the output from said integrator,
   counter means, said counter means connected to measure the duration of any pulses from said switch means,
   metering means, said metering means connected to alternately measure the output of said integrator means and the output of said counter means, and
   indicator means, said indicator means connected so as to give an indication to the user the solar radiation level or that it has reached a predetermined cumulative value.

* * * * *